US008971035B2

(12) United States Patent
Tamaki (10) Patent No.: US 8,971,035 B2
(45) Date of Patent: Mar. 3, 2015

(54) ELECTRONIC APPARATUS AND HARD-DISC HOLDER MOUNTED THERETO

(75) Inventor: Yuuta Tamaki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 246 days.

(21) Appl. No.: 12/730,490

(22) Filed: Mar. 24, 2010

(65) Prior Publication Data

US 2010/0254080 A1   Oct. 7, 2010

(30) Foreign Application Priority Data

Apr. 2, 2009   (JP) ................................. 2009-090570

(51) Int. Cl.
*G06F 1/18* (2006.01)
*G11B 33/12* (2006.01)

(52) U.S. Cl.
CPC .............. *G11B 33/124* (2013.01); *G06F 1/187* (2013.01); *G11B 33/123* (2013.01)
USPC .................... 361/679.33; 312/223.1

(58) Field of Classification Search
CPC ....... G06F 1/187; G06F 1/184; G06F 3/0689; G06F 1/16; G06F 1/1658; G06F 1/181; H05K 9/0007; H05K 7/148; H05K 7/1489; G11B 33/126; G11B 33/128; G11B 23/0323; G11B 33/124; G11B 17/022; G11B 17/038
USPC ............... 361/679.33–679.39, 724–732, 748, 361/752, 679.02; 312/223.1–223.2
See application file for complete search history.

(56) References Cited

U.S. PATENT DOCUMENTS

| 5,224,019 | A  | * | 6/1993  | Wong et al. ............... 361/679.37 |
| 6,122,173 | A  | * | 9/2000  | Felcman et al. ............... 361/726 |
| 6,529,373 | B1 | * | 3/2003  | Liao et al. ................ 361/679.33 |
| 6,839,228 | B2 | * | 1/2005  | Choi ......................... 361/679.33 |
| 7,239,510 | B1 | * | 7/2007  | Lin ............................ 361/679.02 |
| 7,345,869 | B2 | * | 3/2008  | Hsiao ........................ 361/679.01 |
| 7,391,608 | B2 | * | 6/2008  | Tsai ........................... 361/679.33 |
| 8,050,027 | B2 | * | 11/2011 | Liang ........................ 361/679.37 |
| 2002/0085346 | A1 |   | 7/2002  | Choi |
| 2006/0221566 | A1 | * | 10/2006 | Prasad ........................... 361/683 |
| 2008/0247130 | A1 | * | 10/2008 | Chen ............................. 361/685 |
| 2008/0310095 | A1 | * | 12/2008 | Chiang et al. ................ 361/685 |
| 2009/0161309 | A1 | * | 6/2009  | Yang ........................ 361/679.39 |

FOREIGN PATENT DOCUMENTS

JP          9-297633        11/1997
JP          2003-224372     8/2003

OTHER PUBLICATIONS

Japanese Office Action dated Dec. 4, 2012, from corresponding Japanese Application No. 2009-090570.

* cited by examiner

*Primary Examiner* — Anthony Haughton
*Assistant Examiner* — Ingrid Wright
(74) *Attorney, Agent, or Firm* — Katten Muchin Rosenman LLP (57) ABSTRACT

Provided is an electronic apparatus capable of reducing dependence of a connection state between a hard disc device and a connector on degree of fastening of a screw. A hard-disc-insertion opening serving as an opening through which a hard disc device is inserted into a housing is formed in a front plate portion of the housing. A connector of a circuit board is arranged facing the hard-disc-insertion opening on a back side of the hard-disc-insertion opening. A fastener for fixing the hard disc device to an electronic apparatus is inserted into the housing through a bottom plate portion of the housing.

3 Claims, 13 Drawing Sheets

ELECTRONIC APPARATUS AND HARD-DISC HOLDER MOUNTED THERETO

CROSS-REFERENCE TO RELATED APPLICATION

The present application claims priority from Japanese application JP 2009-090570 filed on Apr. 2, 2009, the content of which is hereby incorporated by reference into this application.

BACKGROUND OF THE INVENTION

1. Field of the Invention

The present invention relates to an electronic apparatus structured so as to be capable of replacing a hard disc device, and to a hard-disc holder for holding the hard disc device.

2. Description of the Related Art

Some electronic apparatuses including a hard disc device, such as a game device and a personal computer, have a structure in which the hard disc device can be replaced without opening a housing of the electronic apparatus (for example, JP 2003-224372 A). In the housing of such an electronic apparatus, an opening (hereinafter, referred to as "hard-disc-insertion opening") is formed, via which the hard disc device and a holder therefor are taken out or inserted.

SUMMARY OF THE INVENTION

A circuit board incorporated into an electronic apparatus is provided with a connector, which is electrically connected to a hard disc device. In a structure in which the connector on the circuit board is arranged so as to face a hard-disc-insertion opening, an insertion direction of the hard disc device and a fitting direction (that is, an insertion direction) of the connector are parallel with each other. In such a structure, when a pin-shaped fastener (for example, a screw and a bolt) for fixing the holder of the hard disc device to the circuit board or a chassis in the housing is inserted in the same direction as the insertion direction of the hard disc device, a connection state (that is, correctness of connection) between the hard disc device and the connector depends on whether the screw or the like is firmly fastened or not. Therefore, it is difficult to connect the hard disc device appropriately to the connector. That is, when the screw is fastened too tightly, the hard disc device is pushed toward the connector, and a load is applied to the connector. On the contrary, when the screw is insufficiently fastened, the hard disc device does not reach a correct position with respect to the connector, and hence the hard disc device and the connector are inappropriately connected to each other.

The present invention has been made in view of the above-mentioned problem, and an object thereof is to provide an electronic apparatus and a hard-disc holder capable of reducing dependence of a connection state between the hard disc device and the connector on the degree of fastening of the fastener.

In order to solve the above-mentioned problem, an electronic apparatus according to the present invention includes: a hard disc device; a circuit board provided with a connector to be connected to the hard disc device; and a housing for housing the hard disc device and the circuit board, the housing including a first outer plate portion forming an outer surface of the housing and a second outer plate portion standing upright on an edge of the first outer plate portion. A hard-disc-insertion opening serving as an opening, from which the hard disc device is inserted into the housing, is formed in the second outer plate portion, and the connector of the circuit board is arranged on a back side of the hard-disc-insertion opening so as to face the hard-disc-insertion opening. Further, a pin-shaped fastener for fixing the hard disc device to the electronic apparatus is inserted into the housing through the first outer plate portion.

In the present invention, while the hard-disc-insertion opening is formed in the second outer plate portion, the fastener is inserted through the first outer plate portion. Therefore, it is possible to reduce dependence of a connection state (that is, correctness of connection) between the hard disc device and the connector on degree of fastening of the fastener.

Further, according to an aspect of the present invention, the electronic apparatus may further include a hard-disc holder, which has a holder body for holding the hard disc device, and has a fixing plate formed projecting from the holder body. Further, the fixing plate may have a fixing hole, which is formed therein, and into which the fastener is inserted, and the fixing plate may be arranged along the first outer plate portion. According to this aspect, it is possible not only to reduce dependence of the connection state between the hard disc device and the connector on a degree of fastening of the fastener, but also to fix the hard disc device to the electronic apparatus through the hard-disc holder.

Further, according to this aspect, the electronic apparatus may further include a chassis arranged along the first outer plate portion. Further, at least one of the chassis and the circuit board may have a fixing hole, which is formed therein, and into which the fastener is inserted, and the fixing hole of the fixing plate may be formed such that when the hard disc device fits into the connector of the circuit board, a position of the fixing hole coincides with a position of the fixing hole of the at least one of the chassis and the circuit board. According to this aspect, the operator can determine whether or not the hard disc device appropriately fits into the connector depending on whether or not the positions of the fixing holes coincide with each other.

Further, according to another aspect of the present invention, the electronic apparatus may further include a chassis housed in the housing. The circuit board and the chassis may be arranged along the first outer plate portion, and both of the circuit board and the chassis may have a fixing hole, which is formed therein, and into which the fastener is inserted. In this aspect, the circuit board can be fixed to the chassis using the fastener for fixing the hard disc device. Therefore, it is possible to reduce the number of components of the electronic apparatus.

Further, a hard-disc holder according to the present invention is adapted to hold a hard disc device, and be inserted into or detached from an electronic apparatus together with the hard disc device. The hard-disc holder includes a holder body, which has a bottom plate portion formed facing a bottom surface of the hard disc device, and a fixing plate, which projects from the holder body, and has a fixing hole, which is formed therein, and into which a pin-shaped fastener for fixing the hard-disc holder to the electronic apparatus is inserted. Further, the fixing plate is formed along a plane including the bottom plate portion.

In the present invention, the fixing plate, in which the fixing hole is formed, is arranged along the plane including the bottom plate portion formed facing the bottom surface of the hard disc device. Therefore, it is possible to reduce dependence of the connection state between the hard disc device and the connector provided on the circuit board on the degree of fastening of the fastener.

DETAILED DESCRIPTION OF THE INVENTION

Figure 1:
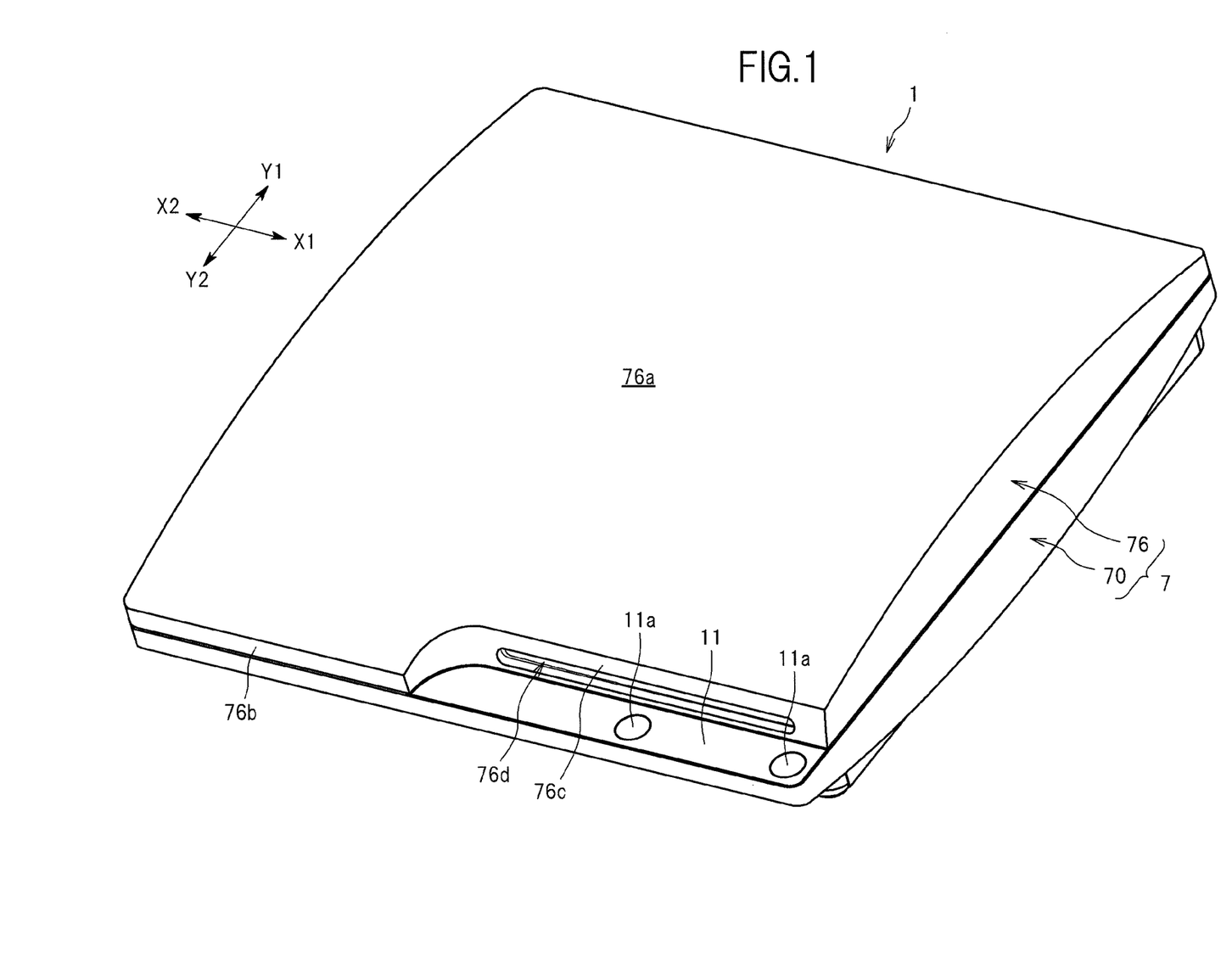
FIG. 1 is a perspective view of an electric device as an example of an embodiment of the present invention.
Figure 2:
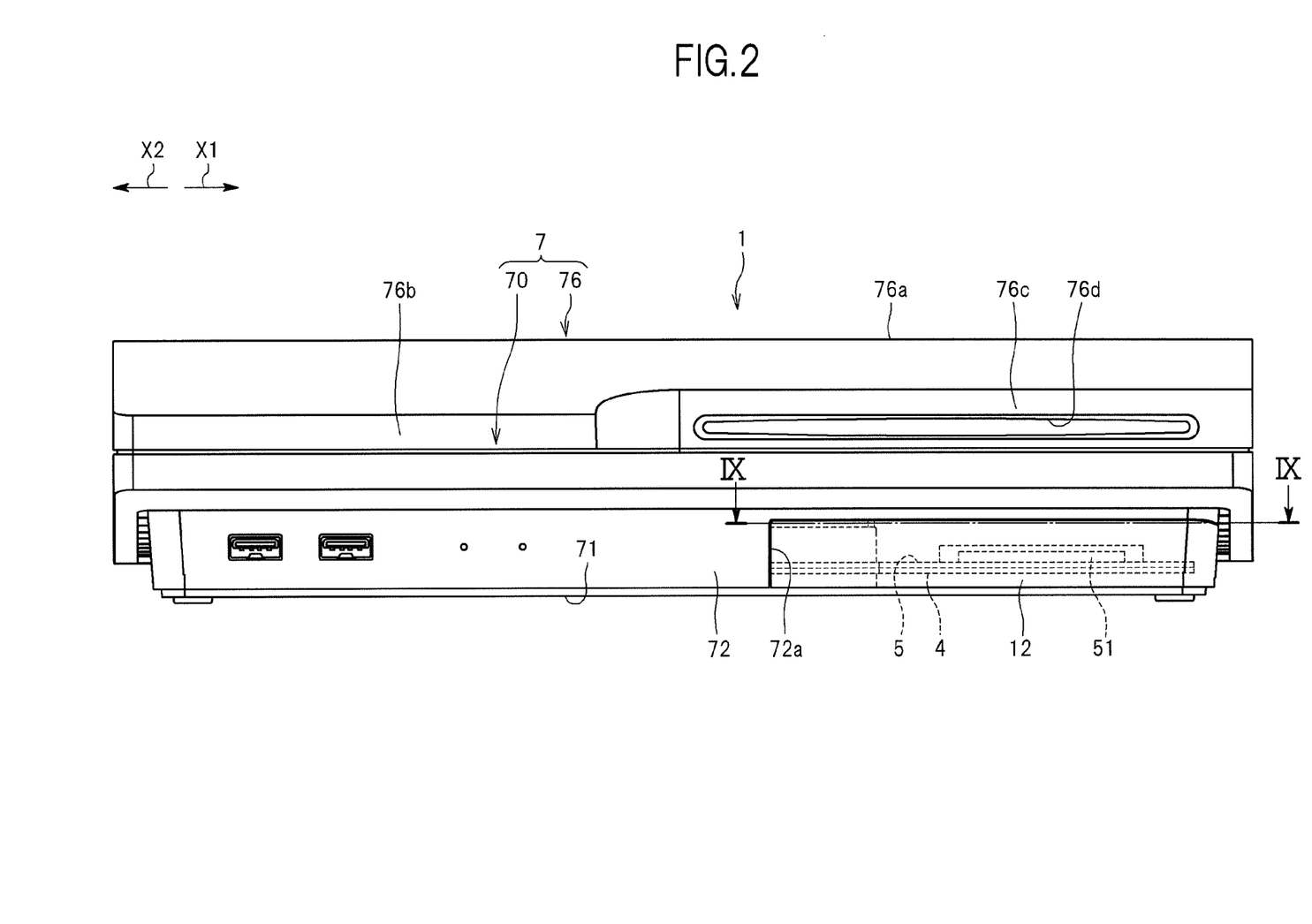
FIG. 2 is a front view of the electronic apparatus, in which a connector to which a hard disc device is connected is indicated by a dashed line.
Figure 3:
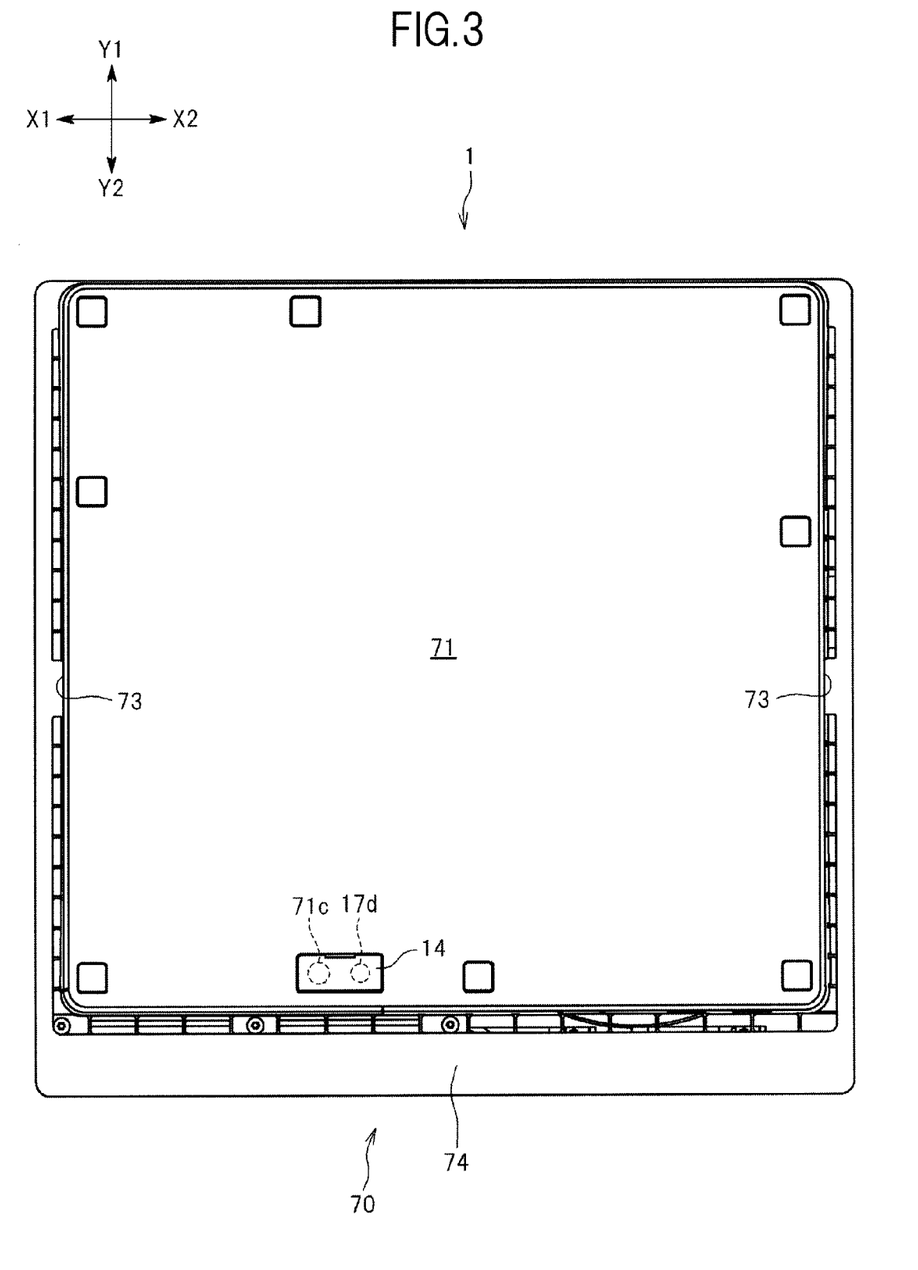
FIG. 3 is a bottom view of the electronic apparatus.
Figure 4:
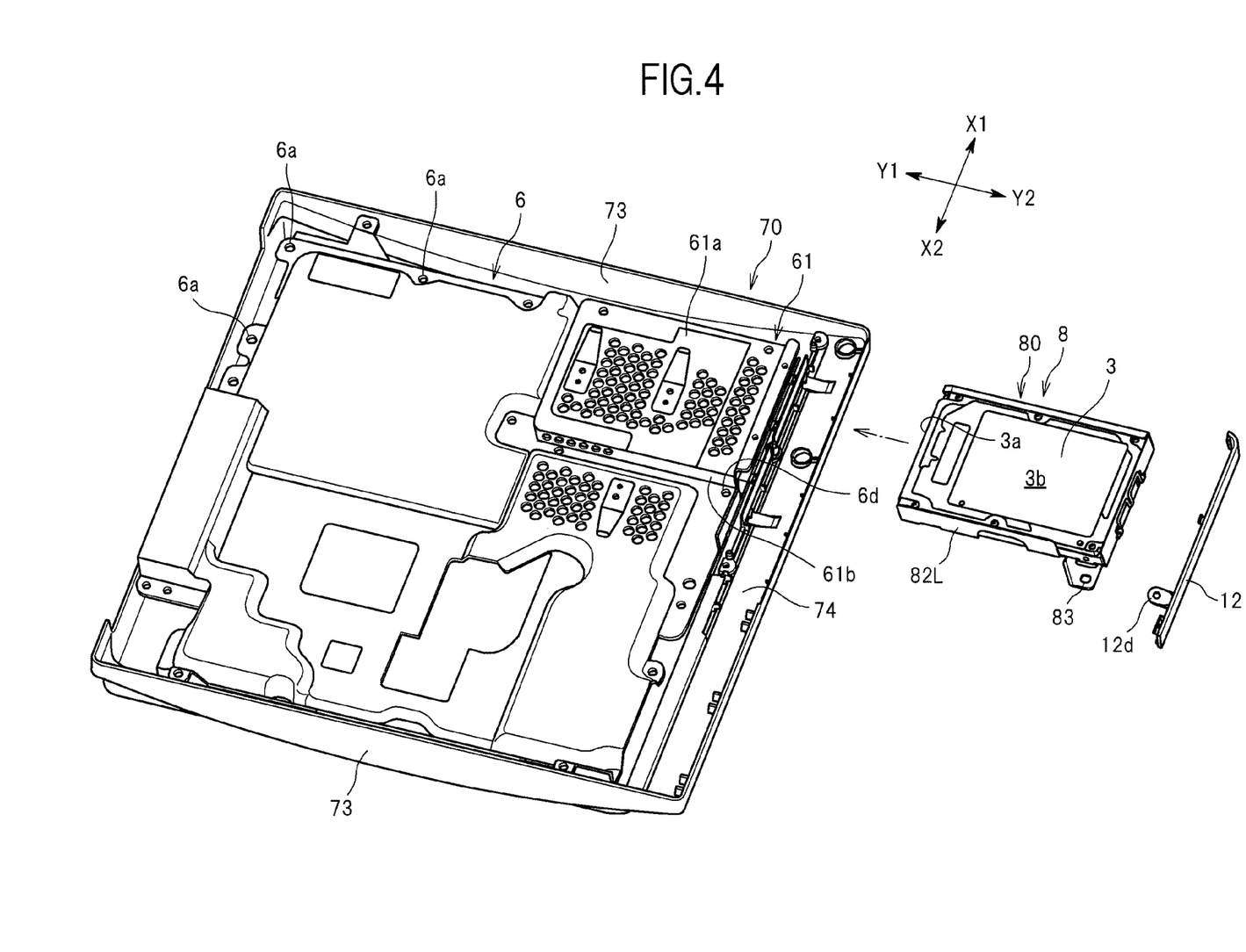
FIG. 4 is a perspective view of a lower housing of the electronic apparatus and the hard disc device, in which an upper chassis is arranged in a lower housing.
Figure 5:
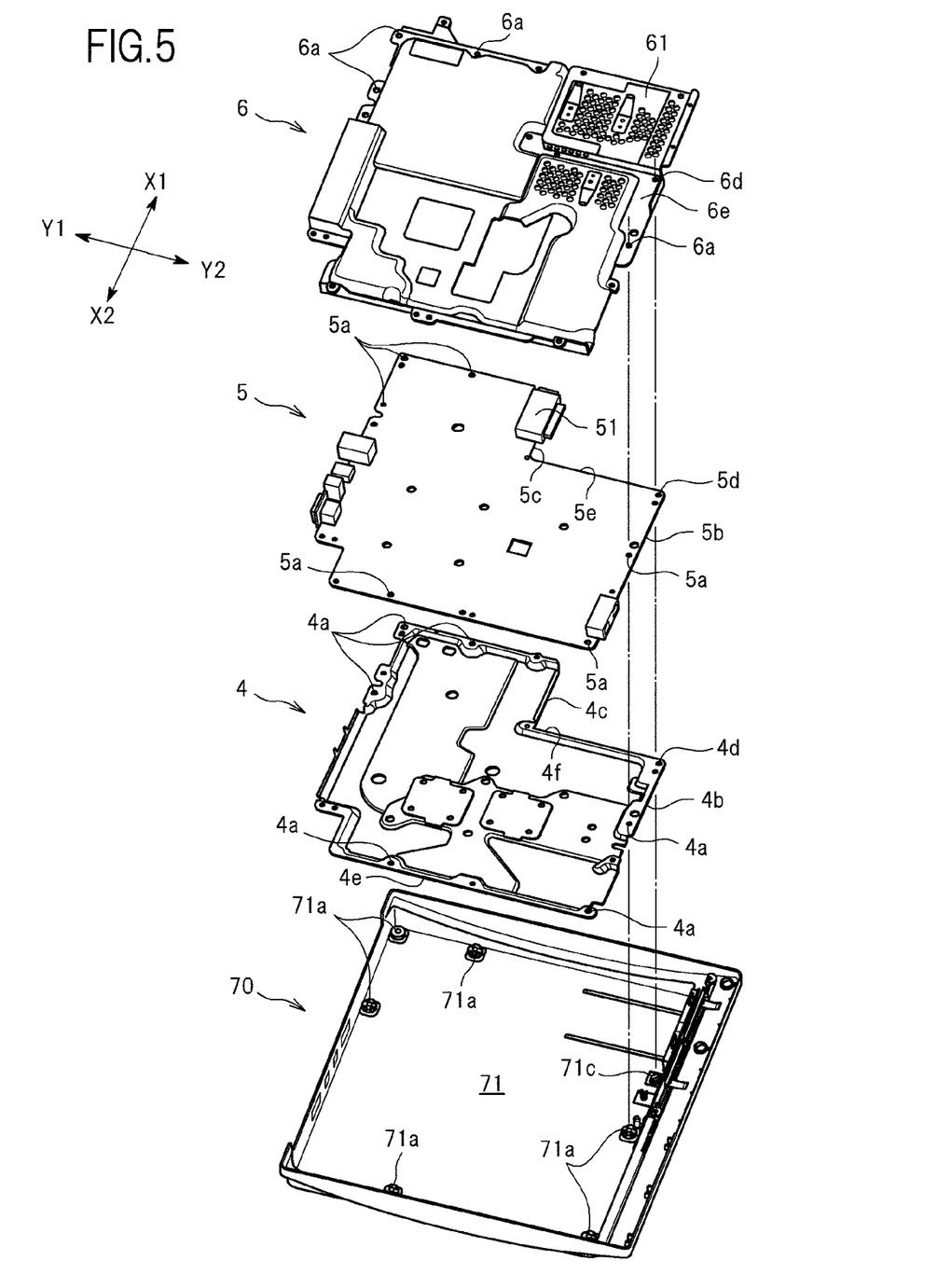
FIG. 5 is an exploded perspective view of the lower housing, a lower chassis, a circuit board, and the upper chassis each provided in the electronic apparatus.
Figure 6:
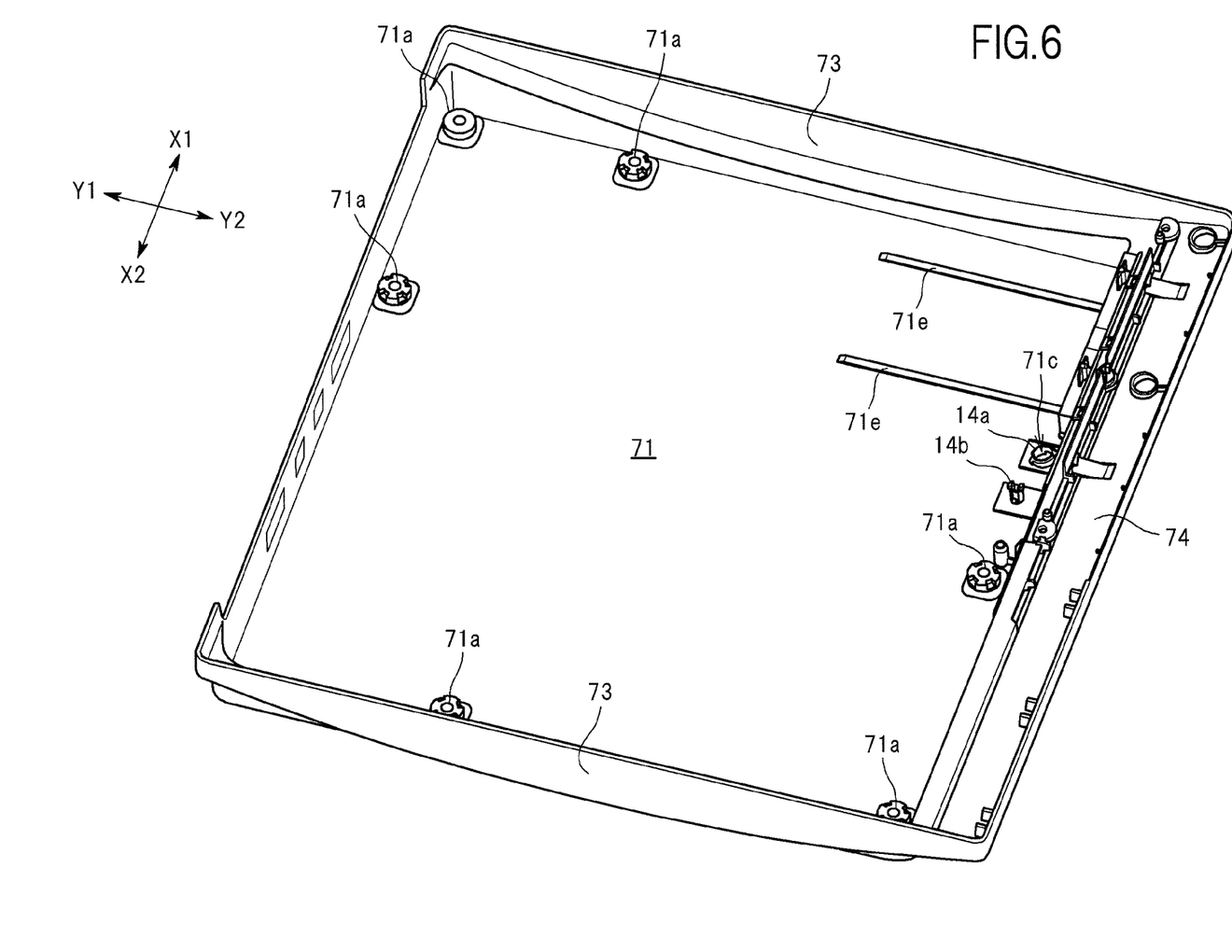
FIG. 6 is a perspective view of the lower housing.
Figure 7:
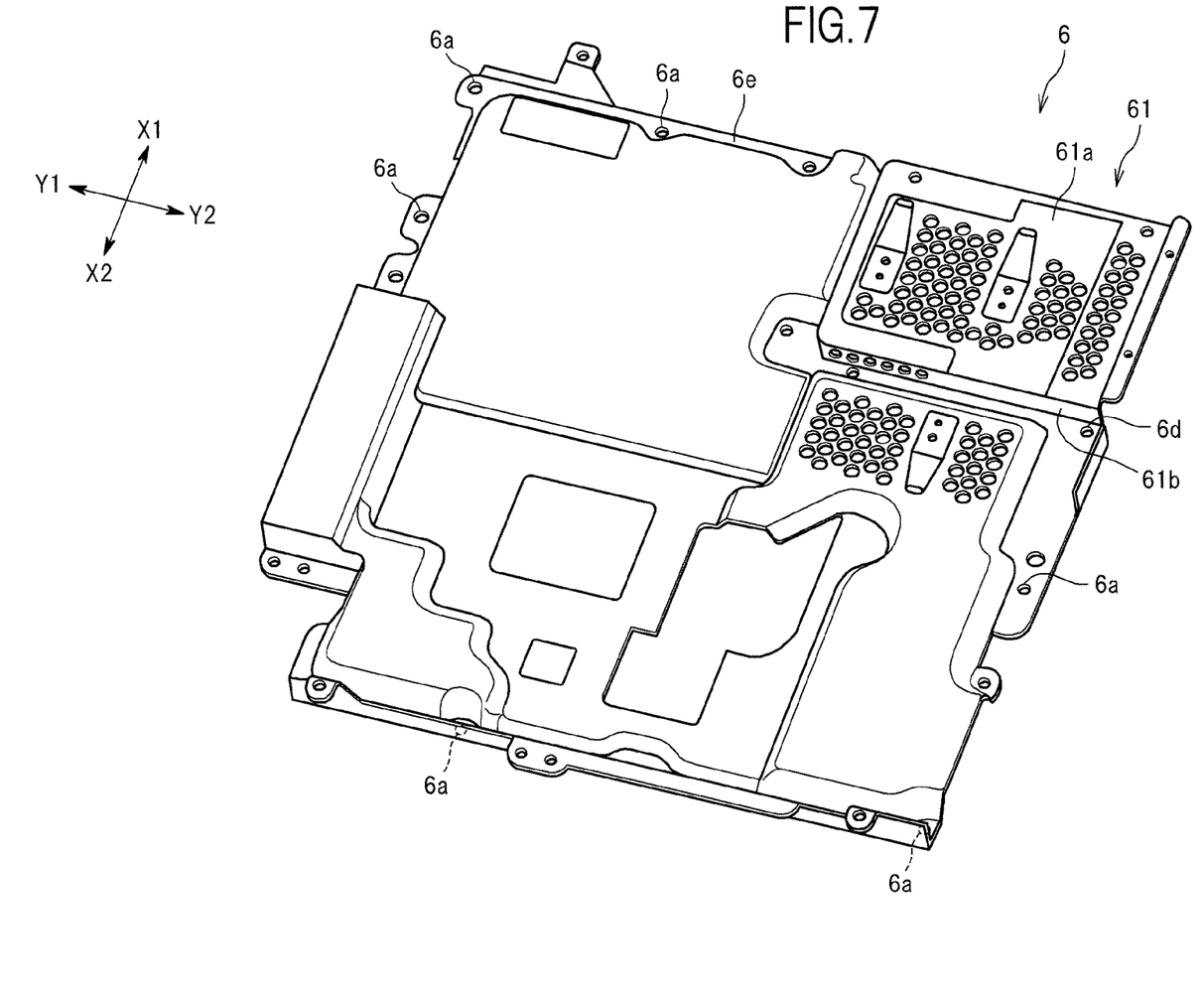
FIG. 7 is a perspective view of the upper chassis.
Figure 8:
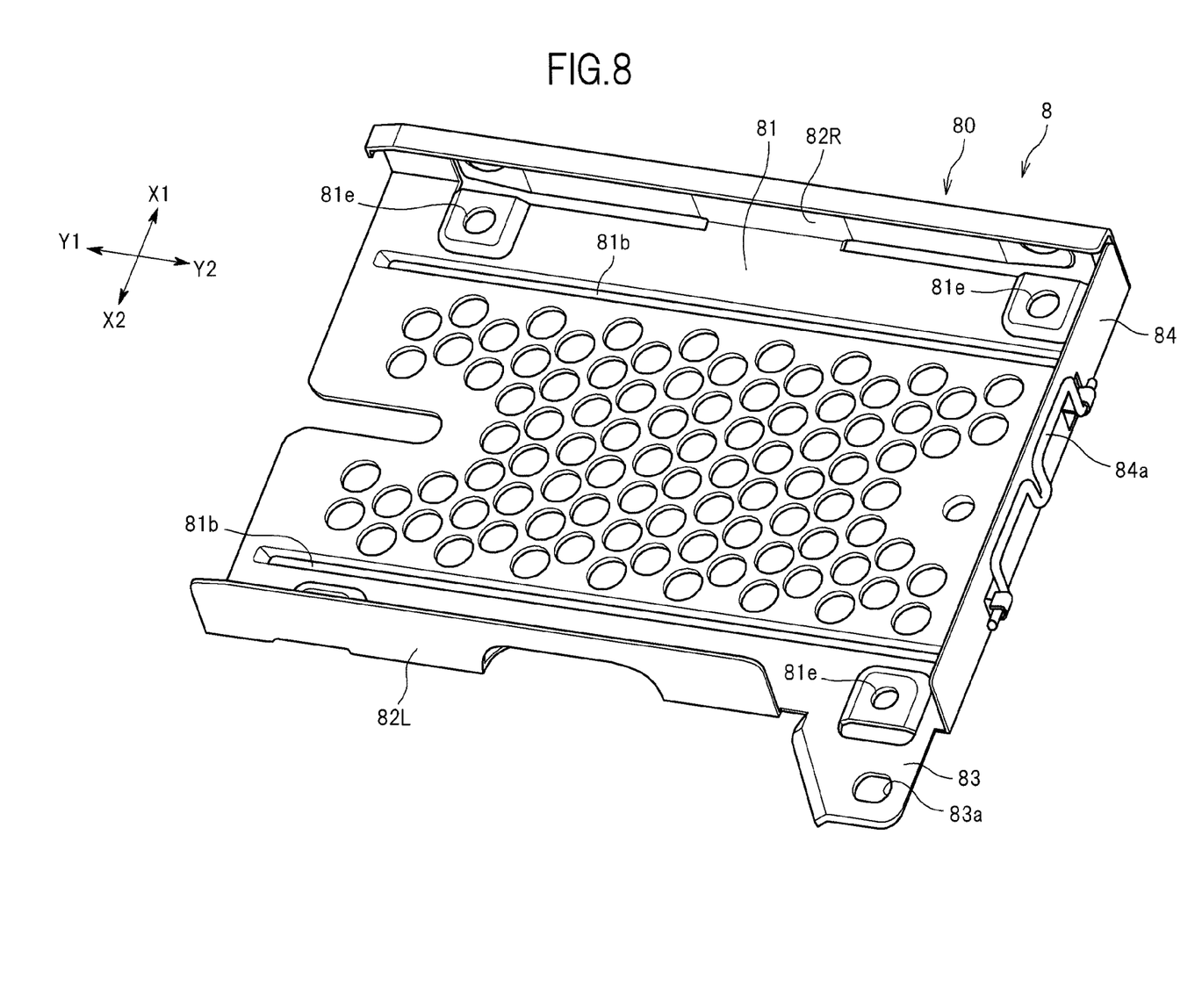
FIG. 8 is a perspective view of a hard-disc holder for holding the hard disc device.
Figure 9:
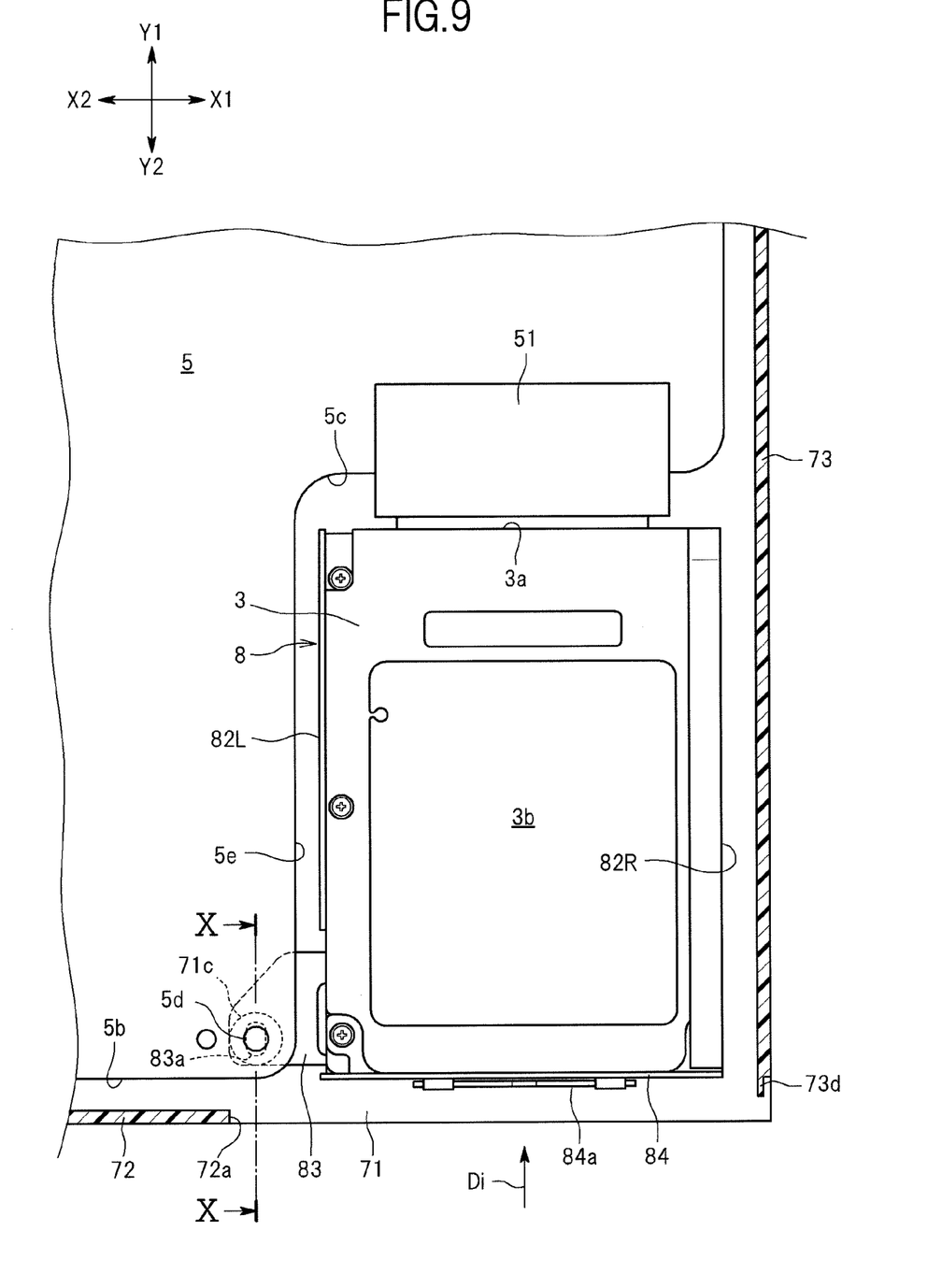
FIG. 9 is a cross-sectional view taken along the line IX-IX of FIG. 2.
Figure 10:
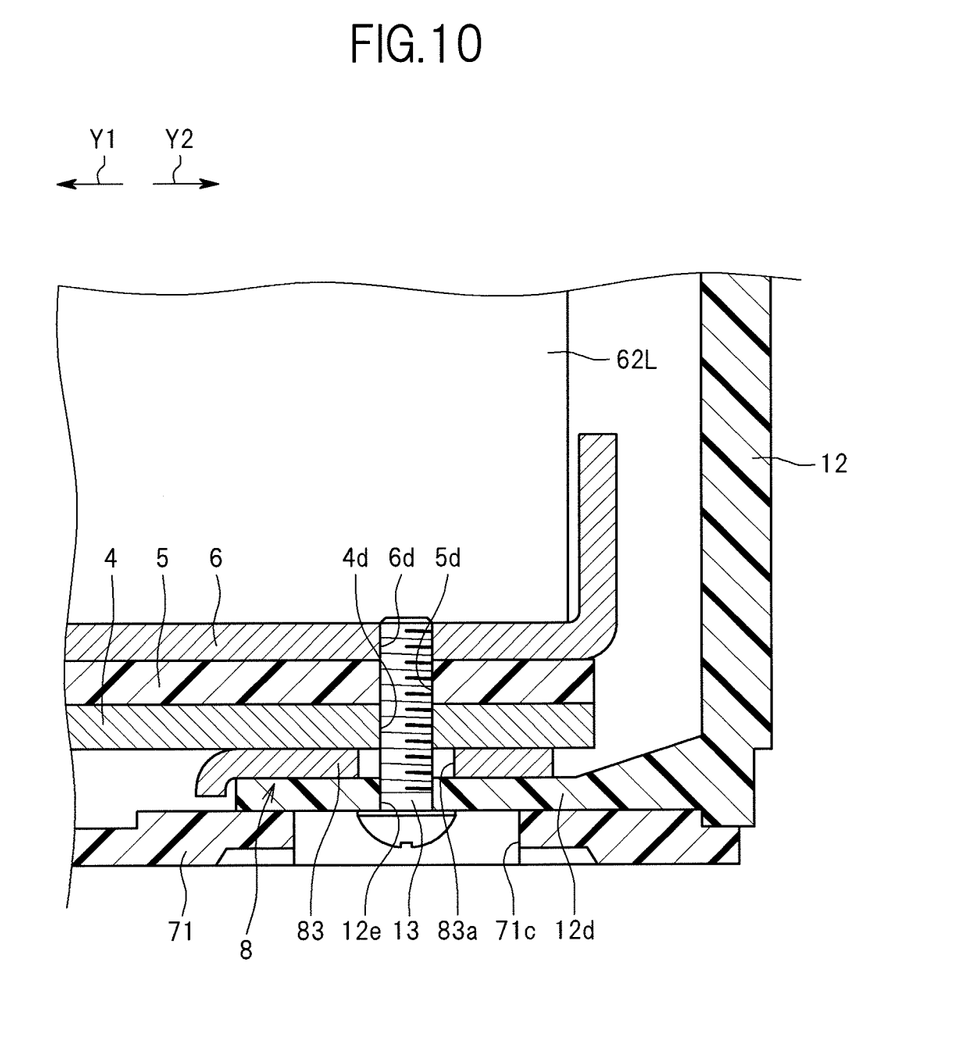
FIG. 10 is a cross-sectional view taken along the line X-X of FIG. 9.
Figure 11:
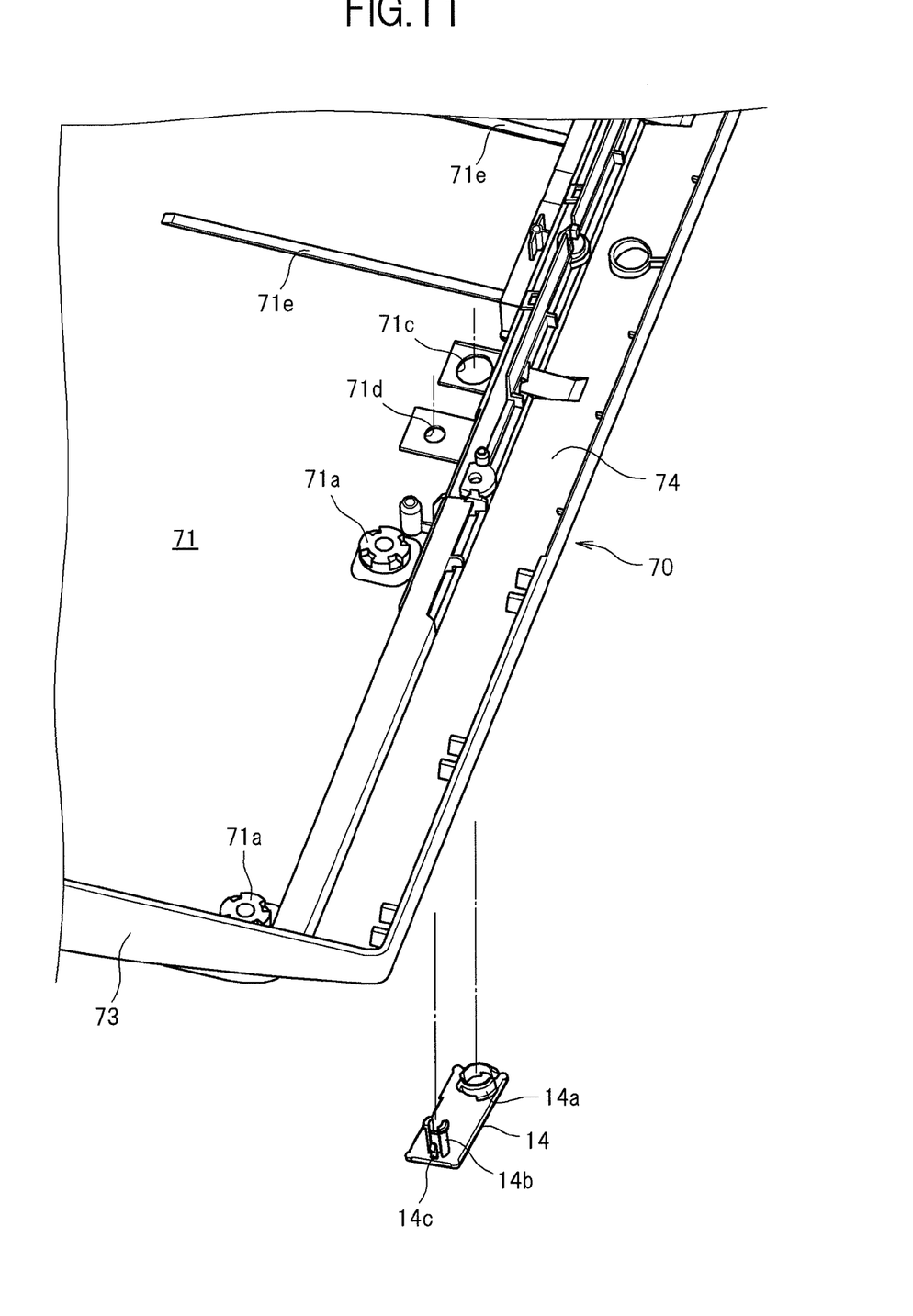
FIG. 11 is a perspective view of a front portion of the lower housing, from which a cap for closing an opening formed in the lower housing is detached.

Hereinafter, an embodiment of the present invention is described with reference to the drawings. FIG. 1 is a perspective view of an electric device 1 as an example of the embodiment of the present invention. FIG. 2 is a front view of the electronic apparatus 1, in which a connector 51, to which a hard disc device 3 is connected, is indicated by a dashed line. FIG. 3 is a bottom view of the electronic apparatus 1. FIG. 4 is a perspective view of a lower housing 70 of the electronic apparatus 1 and the hard disc device 3. In FIG. 4, an upper chassis 6 is arranged in the lower housing 70. FIG. 5 is an exploded perspective view of the lower housing 70, a lower chassis 4, a circuit board 5, and the upper chassis 6, each arranged in the electronic apparatus 1. FIG. 6 is a perspective view of the lower housing 70, and FIG. 7 is a perspective view of the upper chassis 6. FIG. 8 is a perspective view of a hard-disc holder 8 for holding the hard disc device 3. FIG. 9 is a cross-sectional view taken along the line IX-IX of FIG. 2, and FIG. 10 is a cross-sectional view taken along the line X-X of FIG. 9. FIG. 11 is a perspective view of the front portion of the lower housing 70, from which a cap 14 for closing an opening 71c formed therein is detached.

As illustrated in FIG. 1 or 2, the electronic apparatus 1 includes a housing 7 forming its outer surface. The housing 7 includes the lower housing 70 opened upward, and an upper housing 76, which is arranged covering the lower housing 70 from above, to thereby close the lower housing 70 from above.

The upper housing 76 includes an upper plate portion 76a facing the lower housing 70. Further, the upper housing 76 has a left front-plate portion 76b and a right front-plate portion 76c each extending downward toward the lower hosing 70 from the front edge of the upper plate portion 76a. As the electronic apparatus 1, a game device and an audio-visual device are exemplified. The right front-plate portion 76c has a medium insertion slot 76d, which is formed therein, and through which a portable storage media such as an optical disc is inserted. Further, an operation panel 11, provided with a plurality of operation buttons 11a, is arranged in front of the right front-plate portion 76c.

As illustrated in FIG. 2, 3, or 6, the lower hosing 70 includes a substantially rectangular bottom plate portion (corresponding to first outer plate portion in claims) 71. The bottom plate portion 71 forms the bottom of the electronic apparatus 1. In one usage mode of the electronic apparatus 1, the electronic apparatus 1 is placed on an installation surface such that the bottom plate portion 71 faces the installation surface. The lower housing 70 includes a front plate portion (corresponding to second outer plate portion in claims) 72 standing upright on the front edge of the bottom plate portion 71, and side plate portions 73 standing upright on the right and left edges of the bottom plate portion 71. Further, the front portion of the housing 7 is formed projecting forward over the front plate portion 72. Specifically, the lower housing 70 includes a front bottom portion 74 spreading frontward from the upper edge of the front plate portion 72. In this regard, the above-mentioned operation panel 11 is arranged above the front bottom portion 74.

A hard disc device 3 and a hard-disc holder 8 for holding the hard disc device 3 are arranged inside the electronic apparatus 1 (see FIG. 4). As illustrated in FIG. 2, the housing 7 has a hard-disc-insertion opening 72a formed therein, which serves as an opening for allowing detachment and insertion of the hard disc device 3 and the hard-disc holder 8 with respect to the electronic apparatus 1. In this example, the hard-disc-insertion opening 72a is formed in the front plate portion 72 of the lower housing 70. As described above, the housing 7 has a shape in which its front portion projects forward over the front plate portion 72. Therefore, when the electronic apparatus 1 is viewed from obliquely above, the hard-disc-insertion opening 72a is hidden by the front portion of the upper housing 76 and the operation panel 11 facing the front bottom portion 74 (see FIG. 1).

In this example, the hard-disc-insertion opening 72a is formed on one side (right side, in this example) in the lateral direction of the front plate portion 72. In particular, the hard-disc-insertion opening 72a is formed extending from one of the ends in the lateral direction of the front plate portion 72 toward the center of the front plate portion 72. Therefore, as described later, the hard disc device 3 and the hard-disc holder 8, which are inserted through the hard-disc-insertion opening 72a, are arranged along one of the side plate portions 73 of the lower housing 70 (see FIG. 9).

Figure 12:
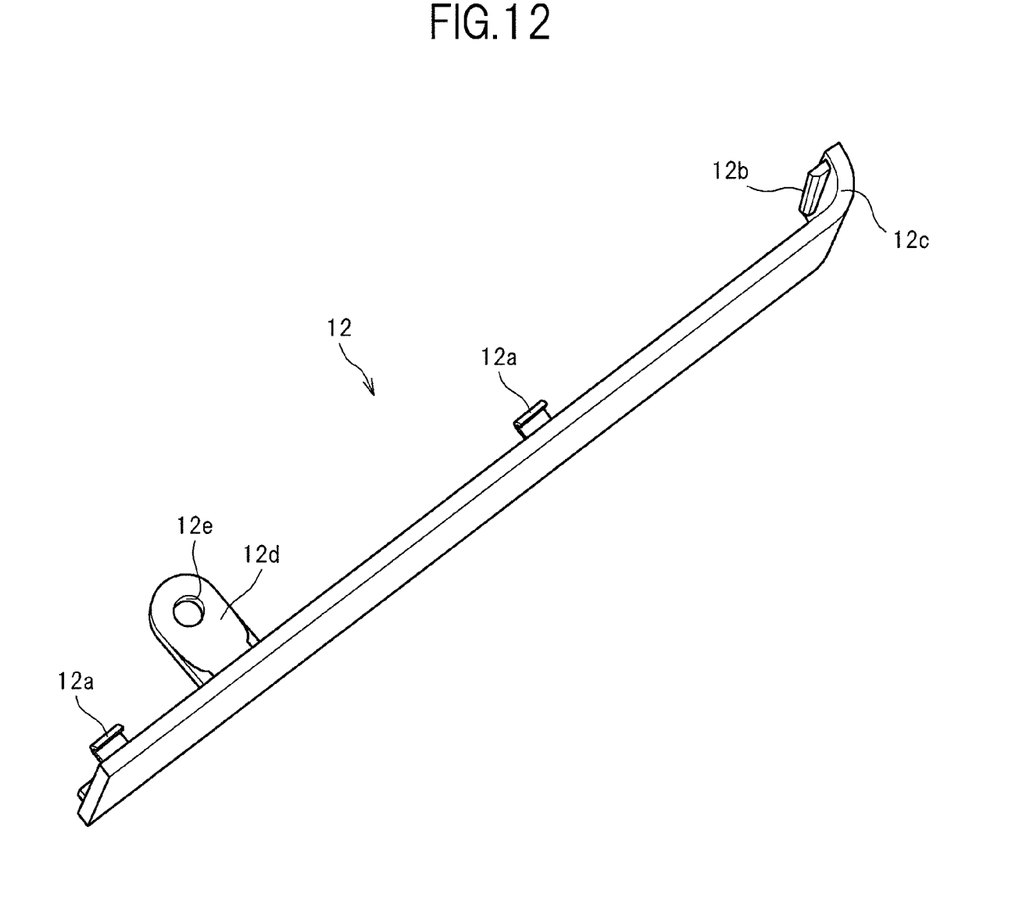
FIG. 12 is a perspective view of an insertion-opening cap for closing a hard-disc-insertion opening.

As illustrated in FIG. 2 or 4, the electronic apparatus 1 includes an insertion-opening cap 12 having a shape corresponding to that of the hard-disc-insertion opening 72a. The insertion-opening cap 12 is attached to the edge of the hard-disc-insertion opening 72a, to thereby close the hard-disc-insertion opening 72a. FIG. 12 is a perspective view of the insertion-opening cap 12. As illustrated in FIG. 12, on the insertion-opening cap 12, claws 12a, which are caught by the edge of the hard-disc-insertion opening 72a, are formed. The edge of the hard-disc-insertion opening 72a is positioned at the end portion of the front plate portion 72, and hence the end portion 12c of the insertion-opening cap 12 is bent toward the side plate portion 73. At the end portion 12c, a protrusion 12b is formed that fits into the hole formed in the edge of the side plate portion 73 (see FIG. 9).

As illustrated in FIG. 5, the electronic apparatus 1 includes the circuit board 5 onto which various electronic components such as an integrated circuit (not shown) are mounted. Further, the electronic apparatus 1 includes the upper chassis 6 and the lower chassis 4, which reinforce the housing 7 and the circuit board 5, and to which devices incorporated in the electronic apparatus 1 (for example, power supply circuit and reader for portable storage medium) are attached. The lower chassis 4, the upper chassis 6, and the circuit board 5 are plate-shaped members, each of which is arranged along the bottom plate portion 71. That is, the lower chassis 4, the upper chassis 6, and the circuit board 5 are substantially arranged in parallel with the bottom plate portion 71, and are stacked on each other. In this example, the circuit board 5 is arranged between the lower chassis 4 and the upper chassis 6.

The lower chassis 4, the circuit board 5, and the upper chassis 6 are fixed to the lower housing 70 with pin-shaped fasteners (such as screws (not shown)) inserted from below. Specifically, as illustrated in FIG. 5 or 6, in the bottom plate portion 71 of the lower housing 70, a plurality of fixing holes 71a arranged along the edge of the bottom plate portion 71 are formed. Further, as illustrated in FIG. 5, a plurality of fixing holes 5a are formed along an outer peripheral edge of the circuit board 5, and a plurality of fixing holes 4a are formed along an outer peripheral edge 4e of the lower chassis 4. Further, as illustrated in FIG. 7, fixing holes 6a are also formed along the outer peripheral edge 6e of the upper chassis 6. The fixing holes 71a, 4a, 5a, and 6a of each member are formed at positions corresponding to each other. The bottom plate portion 71, the lower chassis 4, the circuit board 5, and the upper chassis 6 are fixed together by common screws. That is, respective screws are inserted into the fixing holes 71a, 4a, 5a, and 6a, to thereby fix the lower chassis 4, the circuit board 5, and the upper chassis 6 to the bottom plate portion 71.

The outer peripheral edge 4e of the lower chassis 4 is positioned higher than other portions of the lower chassis 4. Therefore, the outer peripheral edge 4e is spaced away from the bottom plate portion 71, and comes in contact with the lower surface of the circuit board 5. Further, as illustrated in FIG. 7, the outer peripheral edge 6e of the upper chassis 6 is positioned lower than other portions of the upper chassis 6. Therefore, the outer peripheral edge 6e of the upper chassis 6 comes in contact with the upper surface of the circuit board 5. A space is formed between a portion inside the outer peripheral edge 6e of the upper chassis 6 and the circuit board 5, and the electronic components on the circuit board 5 are located in this space.

As illustrated in FIG. 5 or 9, the circuit board 5 has a partially-cutout rectangular shape. That is, in the circuit board 5, a front edge 5b is recessed rearward (in the direction indicated by the arrow Y1 in FIG. 5) to form a recessed portion 5c. In this example, the recessed portion 5c is positioned at one of the corners of the circuit board 5, and hence the circuit board 5 has a shape in which one of the corners of the rectangle is cut out. The recessed portion 5c is positioned on the back side of the hard-disc-insertion opening 72a, and the shape of the recessed portion 5c corresponds to that of the hard disc device 3. That is, the recessed portion 5c has a substantially rectangular shape.

As illustrated in FIG. 5, similarly to the circuit board 5, the lower chassis 4 has a partially-cutout rectangular shape. That is, also in the lower chassis 4, a front edge 4b is recessed rearward to form a recessed portion 4c. The recessed portion 4c is also positioned on the back side of the hard-disc-insertion opening 72a, and has a shape corresponding to the shape of the hard disc device 3 similar to the recessed portion 5c of the circuit board 5.

Therefore, the hard disc device 3 and the hard-disc holder 8 inserted through the hard-disc-insertion opening 72a are arranged inside the recessed portions 5c and 4c, and come in contact with the bottom plate portion 71 of the lower housing 70 (see FIG. 9). In other words, side surfaces of the hard disc device 3 and the hard-disc holder 8 are surrounded by edges of the recessed portions 5c and 4c and the side plate portion 73, and the hard disc device 3 and the hard-disc holder 8 are located on the bottom plate portion 71 of the lower housing 70.

On the edge of the recessed portion 5c of the circuit board 5, a connector 51 for electrically connecting the hard disc device 3 and the circuit board 5 to each other is mounted. In this example, the connector 51 has a substantially rectangular-parallelepiped shape, and is mounted on the circuit board 5 so as to project forward (project in a direction indicated by the arrow Y2 in FIG. 5) from the edge of the recessed portion 5c. Further, the connector 51 is arranged on the back side of the hard-disc-insertion opening 72a so as to face the hard-disc-insertion opening 72a (see FIG. 2). Therefore, when the above-mentioned insertion-opening cap 12 is detached from the hard-disc-insertion opening 72a, the connector 51 is exposed through the hard-disc-insertion opening 72a. A connector portion (not shown) to be fitted to the connector 51 is formed (see FIG. 9) on a surface 3a of the hard disc device 3 (hereinafter, the surface is referred to as "connecting surface") that faces the connector 51. The fitting direction (that is, insertion direction) of the connector 51 and the hard disc device 3 is substantially parallel to the insertion direction (direction indicated by the arrow Di of FIG. 9, that is, rearward in this example) of the hard disc device 3 into the hard-disc-insertion opening 72a. Further, the connector 51 is arranged to face the connector portion provided on the connecting surface 3a of the hard disc device 3 at the time of inserting the hard disc device 3.

As illustrated in FIG. 4 or FIG. 7, the upper chassis 6 includes a receiving portion 61 positioned on the back side of the hard-disc-insertion opening 72a, and covering the space in which the hard disc device 3 is disposed. The receiving portion 61 has a shape corresponding to the shape of the hard disc device 3. Specifically, the hard disc device 3 has a flat rectangular parallelepiped shape, and the receiving portion 61 has a box-like shape opened forward, downward, and rightward. The receiving portion 61 has an upper wall portion 61a, which is formed extending rearward from the hard-disc-insertion opening 72a, and covering the hard disc device 3 from above. Further, the receiving portion 61 has a side wall portion 61b, which is formed extending downward from the edge of the upper wall portion 61a, and facing one of the left side surface and the right side surface (in this example, left side surface) of the hard disc device 3. Further, the receiving portion 61 is opened toward the bottom plate portion 71, the side plate portion 73, and the hard-disc-insertion opening 72a of the lower housing 70. Further, the receiving portion 61 is positioned corresponding to the recessed portion 5c of the circuit board 5 and the recessed portion 4c of the lower chassis 4. That is, the recessed portions 5c and 4c are positioned below the upper wall portion 61a of the receiving portion 61. In this regard, a plurality of air vents are formed in the upper wall portion 61a and the side wall portion 61b, and the air flowing inside the housing 7 passes through those air vents, to thereby cool the hard disc device 3.

As illustrated in FIG. 4 or FIG. 9, the hard-disc holder 8 holds the hard disc device 3, with the connecting surface 3a provided with the connector portion being exposed to the outside. Specifically, as illustrated in FIG. 8, the hard-disc holder 8 has a holder body 80. The holder body 80 includes a bottom plate portion 81 facing the bottom surface of the hard disc device 3, and side plate portions 82R and 82L each standing upright on the right and left edges of the bottom plate portion 81, respectively, and facing surfaces different from the connecting surface 3a of the hard disc device 3 (in this example, the surfaces are side surfaces of the hard disc device 3). The side plate portions 82R and 82L are formed sandwiching the hard disc device 3 from the right and the left, whereby the holder body 80 holds the hard disc device 3 by the side plate portions 82R and 82L. In this example, the side plate portions 82L and 82R are formed by bending a plate-shaped member at the edges of the bottom plate portion 81, and a distance between the side plate portions 82L and 82R is slightly smaller than the width of the hard disc device 3. Therefore, the hard disc device 3 is fitted between the side plate portions 82R and 82L against the force tending to maintain the shape of the holder body 80. In this regard, the bottom plate portion 81 has holes 81e formed therein, into which screws (not shown) for fixing the hard disc device 3 to the hard-disc holder 8 are screwed. Further, the bottom plate portion 81 has a plurality of air vents formed therein, through which the air flowing inside the housing 7 toward the hard disc device 3 passes. Further, the holder body 80 has a rear wall portion 84 facing a surface opposite to the connecting surface 3a of the hard disc device 3. The rear wall portion 84 is provided with a knob 84a.

Below, a structure for fixing the hard disc device 3 to the electronic apparatus 1 will be described in detail.

As illustrated in FIG. 10, the hard disc device 3 is fixed to the electronic apparatus 1 by a pin-shaped fastener (in this example, screw 13). The screw 13 is inserted in the direction perpendicular to both the insertion direction of the hard disc device 3 and the fitting direction of the connector 51. Further, the screw 13 is inserted in the direction perpendicular to the upper surface of the connector 51 and the upper surface (a surface having a wider width, among surfaces extending from the edge of the connecting surface 3a to the edge of the surface opposite to the connecting surface 3a) 3b of the hard disc device 3. In this example, the hard disc device 3 is arranged along the bottom plate portion 71. The insertion direction of the screw 13 is a direction in which the bottom plate portion 71, the circuit board 5, the lower chassis 4, and the upper chassis 6 are stacked on each other (in this example, the direction is the vertical direction). That is, the screw 13 is inserted from below the bottom plate portion 71 of the lower housing 70, and the insertion direction is perpendicular to the circuit board 5 or the like. The screw 13 fixes the hard-disc holder 8 to the lower chassis 4, the circuit board 5, and the upper chassis 6.

Specifically, as illustrated in FIG. 11, an opening 71c is formed in the bottom plate portion 71 of the lower housing 70. The opening 71c is positioned on the back side of the hard-disc-insertion opening 72a. Further, the opening 71c is spaced rightward or leftward from the side plate portion 73 of the lower housing 70 by a distance corresponding to the width of the hard disc device 3 (see FIG. 9). In this example, the opening 71c is spaced leftward from the side plate portion 73. As illustrated in FIGS. 5 to 7, fixing holes 6d, 5d, and 4d are respectively formed in the upper chassis 6, the circuit board 5, and the lower chassis 4. The fixing holes 6d, 5d, and 4d are positioned corresponding to the position of the opening 71c. That is, the fixing holes 6d, 5d, and 4d are positioned directly above the opening 71c, and the fixing holes 6d, 5d, and 4d, and the opening 71c are positioned on the straight line extending in the vertical direction.

In this example, the fixing hole 5d of the circuit board 5 is formed at the end portion of an edge 5e of edges of the recessed portion 5c, the edge 5e extending in the insertion direction of the hard disc device 3 (see FIG. 9). Similarly, the fixing hole 4d of the lower chassis 4 is formed at the end portion of an edge 4f of edges of the recessed portion 4c, the edge 4f extending in the insertion direction of the hard disc device 3 (see FIG. 5). Further, the fixing hole 6d of the upper chassis 6 is arranged adjacently to the side wall portion 61b of the receiving portion 61 (see FIG. 7).

As illustrated in FIG. 8, the hard-disc holder 8 includes a fixing plate 83 projecting laterally (in this example, leftward (in a direction indicated by the arrow X2)) from the bottom plate portion 81 beyond the side plate portion 82L. Further, the fixing plate 83 is formed along the plane including the bottom plate portion 81. That is, the fixing plate 83 is substantially parallel with the bottom plate portion 81. As described above, when the hard-disc holder 8 is inserted together with the hard disc device 3 through the hard-disc-insertion opening 72a, the hard-disc holder 8 and the hard disc device 3 are arranged along the bottom plate portion 71. Therefore, as illustrated in FIG. 10, when the hard-disc holder 8 is inserted through the hard-disc-insertion opening 72a, the fixing plate 83 faces the bottom plate portion 71. The fixing plate 83 has a fixing hole 83a formed therein, the fixing hole 83a passing through the fixing plate 83 in the vertical direction. The fixing hole 83a is also positioned corresponding to the positions of opening 71c and the fixing holes 6d, 5d, and 4d. That is, in a state in which the connector portion on the connecting surface 3a of the hard disc device 3 fits into the connector 51 of the circuit board 5, and the hard disc device 3 is positioned at a correct position with respect to the connector 51 (that is, a state in which electronic contact between the connector portion of the hard disc device 3 and the connector 51 is sufficiently ensured), the fixing hole 83a, the opening 71c, and the fixing holes 6d, 5d, and 4d are overlapped with each other in the vertical direction (see FIG. 10). The screw 13 is inserted through the opening 71c into the fixing holes 83a, 6d, 5d, and 4d, to thereby fix the hard-disc holder 8 to the lower chassis 4, the circuit board 5, and the upper chassis 6. In this example, a thread groove is formed in the fixing hole 6d of the upper chassis 6. Therefore, by fastening the screw 13, the lower chassis 4, the circuit board 5, the fixing plate 83, and a fixing portion 12d (described later in detail) of the insertion-opening cap 12 are fixed to the upper chassis 6. As a result, the hard-disc holder 8 is fixed to the lower chassis 4, the circuit substrate 5, and the upper chassis 6.

In this regard, as illustrated in FIG. 8, the fixing hole 83a is formed as a long hole elongated in the insertion direction of the hard disc device 3. The length of the fixing hole 83a is set such that, even when the hard disc device 3 is positioned farthest from the connector 51 by the distance which the fixing hole 83a allows, electrical connection between the connector portion of the hard disc device 3 and the connector 51 is suitably ensured.

As described above, the hard-disc-insertion opening 72a is closed by the insertion-opening cap 12. The insertion-opening cap 12 is also fixed together with the hard-disc holder 8 to the electronic apparatus 1 by the screw 13. Specifically, as illustrated in FIG. 10 or 12, the insertion-opening cap 12 has a plate-shaped fixing portion 12d formed therein, the fixing portion 12d protruding toward the inner side of the housing 7 along the bottom plate portion 71. The fixing portion 12d has a fixing hole 12e formed therein, which passes through the fixing portion 12d in the vertical direction. When the insertion-opening cap 12 is attached to the hard-disc-insertion opening 72a, the fixing portion 12d is positioned directly above the opening 71c, and the fixing hole 12e of the fixing portion 12d is overlapped with the fixing holes 83a, 6d, 5d, and 4d in the vertical direction. Further, the screw 13 is also inserted through the fixing hole 12e.

As described above, the outer peripheral edge 4e of the lower chassis 4 is positioned higher than other portions of the lower chassis 4, and is spaced away from the bottom plate portion 71. Therefore, as illustrated in FIG. 10, a space is formed between the portion of the lower chassis 4, in which the fixing hole 4d is formed, and the bottom plate portion 71. When the hard-disc holder 8 is inserted together with the hard disc device 3 through the hard-disc-insertion opening 72a, the fixing plate 83 is located between the lower chassis 4 and the bottom plate portion 71. Further, the fixing portion 12d of the insertion-opening cap 12 is also arranged between the lower chassis 4 and the bottom plate portion 71. In this example, the fixing portion 12d is located between the fixing plate 83 and the bottom plate portion 71. In this regard, because the opening 71c is larger than the fixing holes 83a, 6d, 5d, and 4d, the fixing plate 83 is exposed to the outside through the opening 71c before the insertion-opening cap 12 is attached to the hard-disc-insertion opening 72a. Through the opening 71c, the operator can visually recognize whether or not the position of the fixing hole 83a of the fixing plate 83 coincides with the positions of the fixing holes 6d, 5d, and 4d. Then, as a result of the recognition, the operator can determine whether or not the hard disc device 3 is appropriately positioned with respect to the connector 51.

Further, the end portion of the edge 5e of the circuit board 5, in which the fixing hole 5d is formed, and the end portion of the edge 4f of the lower chassis 4, in which the fixing hole 4d is formed, are exposed to the outside through the hard-disc-insertion opening 72a when the insertion-opening cap 12 is detached therefrom. Therefore, when inserting the hard-disc holder 8 and the hard disc device 3 into the hard-disc-insertion opening 72a, the operator can insert the fixing plate 83 between the edges 5e and 4f and the bottom plate portion 71 of the lower housing 70 while visually confirming the edge 5e of the circuit board 5 and the edge 4f of the lower chassis 4.

As illustrated in FIG. 9, the fixing plate 83 of the hard-disc holder 83 is spaced away from the connecting surface 3a, at which the connector portion is provided, in the direction opposite to the insertion direction of the hard disc device 3. In other words, the fixing plate 83 is formed positioned close to the hard-disc-insertion opening 72a when the hard-disc holder 8 is inserted together with the hard disc device 3 through the hard-disc-insertion opening 72a. In this example, the fixing plate 83 projects laterally from a portion, on the edge of the bottom plate portion 8l, farthest from the connecting surface 3a. Therefore, when the connector portion of the hard disc device 3 fits into the connector 51 of the circuit board 5, the fixing hole 83a is spaced away from the connector 51, whereby the lack of rigidity of the hard disc device 3 with respect to the connector 51 can be reduced. That is, in a structure in which the fixing plate 83 is positioned close to the connecting surface 3a, the fixing plate 83 comes close to the connector 51 when the hard disc device 3 fits into the connector 51. Compared with such structure, in the structure of the electronic apparatus 1 in which the fixing plate 83 is spaced away from the connecting surface 3a, lack of rigidity, which is caused by looseness of the screw 13, of the hard disc device 3 with respect to the connector 51 can be reduced.

In this regard, as illustrated in FIG. 3 or FIG. 11, the cap 14, which is detachable from the opening 71c, is attached to the opening 71c formed in the bottom plate portion 71 of the lower housing 70. The opening 71c is closed by the cap 14.

Figure 13:
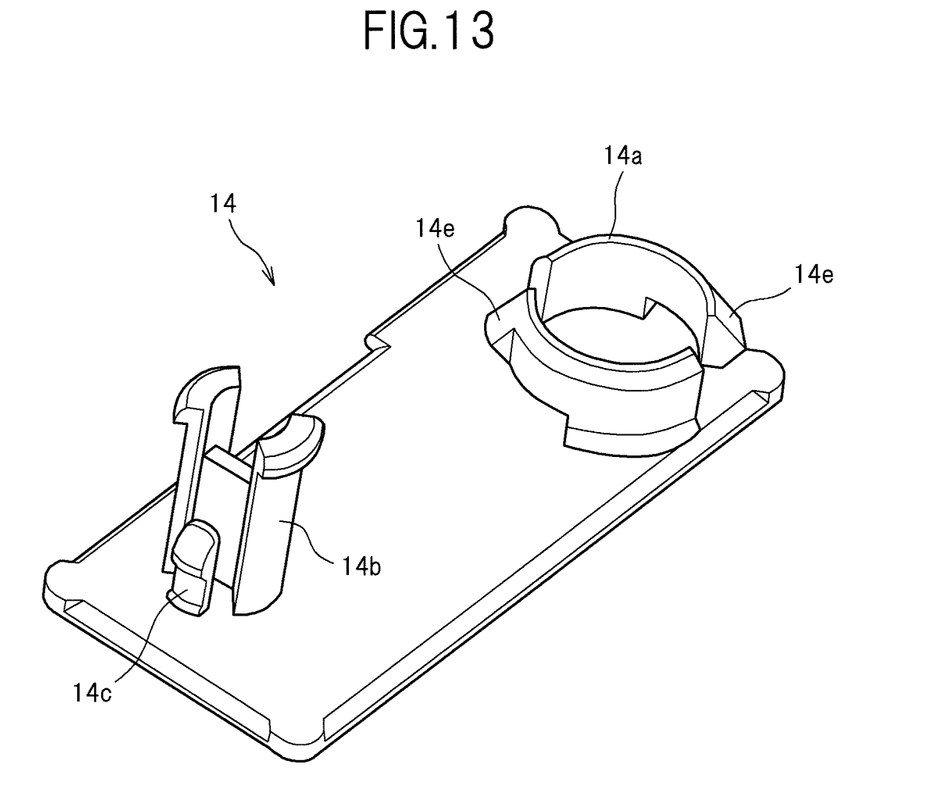
FIG. 13 is a perspective view of the cap for closing the opening formed in the lower housing.

FIG. 13 is a perspective view of the cap 14. The cap 14 is formed so as not to be disengaged from the bottom plate portion 71 when being detached from the opening 71c. That is, the cap 14 is formed so as to remain being caught by the bottom plate portion 71 when being detached from the opening 71c. Specifically, the bottom plate portion 71 has a hole 71d formed therein, in addition to the opening 71c, the hole 71d being adjacent to the opening 71c (see FIG. 11). As illustrated in FIG. 13, the cap 14 includes an engagement portion 14a which protrudes upward and fits into the opening 71c, and engagement portions 14b and 14c which protrude upward and fit into the hole 71d. The engagement portion 14a is formed in a substantially cylindrical shape, and claw portions 14e to be caught by the edge of the opening 71c are formed along the outer peripheral surface of the engagement portion 14a. Tips of the engagement portions 14b and 14c are also formed in a claw-like shape so as to be caught by the edge of the hole 71d. Further, the engagement portion 14b is longer than the engagement portion 14c. When the cap 14 closes the opening 71c and the hole 71d, the claw portions 14e of the engagement portion 14a are caught by the edge of the opening 71c, and the engagement portion 14c is caught by the edge of the hole 71d. When the claw portions 14e of the engagement portion 14a are released from being caught and the cap 14 is detached from the opening 71c, the engagement portion 14b is caught by the edge of the hole 71d while the engagement portion 14c is released from being caught by the edge of the hole 71d. As a result, even when the cap 14 is detached from the opening 71c, the engagement portion 14b keeps the cap 14 being caught by the bottom plate portion 71. In this regard, the cap 14 is completely separated from the bottom plate portion 71 when the engagement portion 14b is released from being caught.

Hereinafter, an attachment operation of the hard disc device 3 will be described. First, the operator inserts the hard disc device 3 held in the hard-disc holder 8 through the hard-disc-insertion opening 72a of the lower housing 70, and then moves the hard disc device 3 rearward (toward the connector 51). As described above, the hard-disc-insertion opening 72a is adjacent to the side plate portion 73. Further, the recessed portion 5c of the circuit board 5 and the recessed portion 4c of the lower chassis 4 are positioned on the back side of the hard-disc-insertion opening 72a. Therefore, the hard disc device 3 and the hard-disc holder 8 inserted through the hard-disc-insertion opening 72a are moved rearward on the bottom plate portion 71 along the side plate portion 73 of the lower housing 70. As illustrated in FIG. 6, in this example, guides 71e extending from the hard-disc-insertion opening 72a in the insertion direction of the hard disc device 3 are formed on the bottom plate portion 71. On the other hand, the bottom plate portion 81 of the hard-disc holder 8 has guided portions 81b formed therein, the guided portions 81b being guided by the guides 71e (see FIG. 8). Therefore, the hard-disc holder 8 and the hard disc device 3 are moved along the guides 71e.

As described above, the connector 51 is arranged directly facing the connector portion provided on the connecting surface 3a of the hard disc device 3. Therefore, when the operator pushes the hard disc device 3 rearward, the connector portion of the hard disc device 3 fits into the connector 51. When the hard disc device 3 reaches the position at which the hard disc device 3 fits into the connector 51, the position of the fixing hole 83a of the hard-disc holder 8 becomes coincident with the positions of the opening 71c of the bottom plate portion 71, the fixing hole 5d of the circuit board 5, the fixing hole 6d of the upper chassis 6, and the fixing hole 4d of the lower chassis 4. That is, the opening 71c and the fixing holes 5d, 6d, and 4d are positioned on the straight line extending in the vertical direction.

The operator fits the connector portion of the hard disc device 3 into the connector 51, and then attaches the insertion-opening cap 12 to the hard-disc-insertion opening 72a. As a result, the position of the fixing hole 12e of the insertion-opening cap 12 also become coincident with those of the fixing hole 4d and the like. After that, the operator inserts the screw 13 through the opening 71c into the fixing holes 83a, 6d, 5d, and 4d, and then fastens the screw 13.

As described above, the electronic apparatus 1 adopts the structure in which the hard-disc-insertion opening 72a is formed in the front plate portion 72, and the connector 51 of the circuit board 5 is arranged on the back side of the hard-disc-insertion opening 72a to face the hard-disc-insertion opening 72a. Further, the screw 13 for fixing the hard disc device 3 to the electronic apparatus 1 is inserted into the housing 7 through the bottom plate portion 71.

In the electronic apparatus 1 having the above-mentioned structure, while the hard-disc-insertion opening 72a is formed in the front plate portion 72, the screw 13 is inserted through the bottom plate portion 71. Therefore, it is possible to reduce the dependence of the connection state between the hard disc device 3 and the connector 51 on the degree of fastening of the screw 13.

Further, as described above, the hard-disc holder 8 includes the fixing plate 83 projecting from the holder body 80 for holding the hard disc device 3. The fixing plate 83 has the fixing hole 83a formed therein, into which the screw 13 for fixing the hard-disc holder 8 to the electronic apparatus 1 is to be inserted. Further, the fixing plate 83 is formed along the plane including the bottom plate portion 81. According to the hard-disc holder 8 described above, it is possible to reduce the dependence of the connection state between the hard disc device 3 and the connector 51 on degree of fastening of the screw 13.

Note that the present invention is not limited to the above-mentioned electronic apparatus 1, and various modifications can be made thereto. For example, though the hard-disc-insertion opening 72a is formed in the front plate portion 72 in the above description, the position of the hard-disc-insertion opening 72a is not limited thereto. For example, the hard-disc-insertion opening 72a may be formed in the side plate portion 73.

Further, in the above description, the screw 13 for fixing the hard disc device 3 to the electronic apparatus 1 is also used for fixing the circuit board 5 to the upper chassis 6 and the lower chassis 4. However, the screw 13 may be used only for fixing the hard disc device 3 to the upper chassis 6, the lower chassis 4, or the bottom plate portion 71 of the lower housing 70.

Further, in the above description, the hard disc device 3 is arranged on the bottom plate portion 71 of the lower housing 70. However, the hard disc device 3 maybe arranged on the lower chassis 4, the circuit board 5, or the upper chassis 6.

What is claimed is:

1. An electronic apparatus, comprising:
an assembly including a hard disc device and a hard disc holder which holds the hard disc device;
a circuit board provided with a connector to be connected to the hard disc device;
a chassis attached to the circuit board;
a housing which houses the chassis and the circuit board, and into which the assembly is inserted from outside thereof, the housing including a first outer plate portion being along an insertion direction of the assembly and a second outer plate portion standing upright on an edge of the first outer plate portion, the second outer plate portion having a hard-disc-insertion opening formed thereon for inserting the assembly into the housing;
an opening formed on the first outer plate portion;
a fixing hole formed on the chassis;
a fixing plate provided to the hard disc holder that is formed to be arranged substantially parallel to the first outer plate portion, wherein the fixing plate is located between the chassis and the first outer plate portion of the housing, the fixing plate having a hole formed as a long hole elongated in the insertion direction of the assembly with a larger size than that of the fixing hole of the chassis,
wherein the hole of the fixing plate coincides in position with the opening of the first outer plate portion and the fixing hole of the chassis when the hard disc device is connected to the connector; and
a pin-shaped fastener for fixing the hard disc holder to the chassis, wherein the pin-shaped fastener is inserted from outside of the housing into the opening of the first outer plate portion and the hole of the fixing plate to be fixed to the fixing hole of the chassis.

2. The electronic apparatus according to claim 1, wherein the circuit board has a fixing hole, which is formed therein, and into which the pin-shaped fastener is inserted; and
the hole of the fixing plate is formed such that when the hard disc device fits into the connector of the circuit board, the hole of the fixing plate is positioned corresponding to a position of the fixing holes of the chassis and the circuit board.

3. An electronic apparatus, comprising:
an assembly including a hard disc device and a hard disc holder which holds the hard disc device;
a circuit board provided with a connector to be connected to the hard disc device;
a chassis attached to the circuit board;
a housing which houses the chassis and the circuit board, and into which the assembly inserted from outside thereof, the housing including an outer plate portion being along an insertion direction of the assembly;
an opening formed on the outer plate portion;
a fixing hole formed on the chassis;
a fixing plate provided to the hard disc holder that is arranged substantially parallel to the outer plate portion, wherein the fixing plate is located between the chassis and the outer plate portion of the housing, the fixing plate having a hole formed as a long hole elongated in the insertion direction of the assembly with a larger size than that of the fixing hole of the chassis,
wherein the hole of the fixing plate coincides in position with the opening of the outer plate portion and the fixing hole of the chassis when the hard disc device is connected to the connector; and
a pin-shaped fastener for fixing the hard disc holder to the chassis, wherein the pin-shaped fastener is inserted in a direction substantially perpendicular to the insertion direction of the assembly from outside of the housing into the opening of the outer plate portion and the hole of the fixing plate to be fixed to the fixing hole of the chassis.

* * * * *